(12) United States Patent
Van Vooren et al.

(10) Patent No.: US 7,337,995 B2
(45) Date of Patent: Mar. 4, 2008

(54) KERNEL CRACKING ASSEMBLY

(75) Inventors: Sandor W. Van Vooren, Sijsele-Damme (BE); Dirk J. Desnijder, Wodelgem (BE)

(73) Assignee: CNH America LLC, New Holland, PA (US)

( * ) Notice: Subject to any disclaimer, the term of this patent is extended or adjusted under 35 U.S.C. 154(b) by 253 days.

(21) Appl. No.: 11/112,514

(22) Filed: Apr. 22, 2005

(65) Prior Publication Data
US 2005/0263627 A1 Dec. 1, 2005

(30) Foreign Application Priority Data
May 27, 2004 (GB) ................... 0411825.3

(51) Int. Cl.
*B02C 4/32* (2006.01)
(52) U.S. Cl. ............... 241/37; 241/232; 241/285.3
(58) Field of Classification Search .................. 241/37, 241/230–234, 17, 285.3
See application file for complete search history.

(56) References Cited

U.S. PATENT DOCUMENTS 5,407,138 A * 4/1995 Graenicher et al. ............ 241/6
6,290,599 B1 9/2001 Eis et al.

FOREIGN PATENT DOCUMENTS

| EP | 1166619 | * | 6/2001 |
| FR | 2559996 | * | 8/1985 |
| GB | 2286107 | | 8/1995 |
| GB | 0411825.3 | | 5/2004 |

* cited by examiner

*Primary Examiner*—Mark Rosenbaum
(74) *Attorney, Agent, or Firm*—Michael G. Harms; John William Stader; Patrick M. Sheldrake

(57) ABSTRACT

A kernel cracking assembly comprises two frames each supporting a respective one of two rollers between which kernels are crushed. A hydraulically operated actuator acts to move the frame relative to frame to set the separation of the rollers. A position sensor coupled to the actuator forms part of a closed-loop feedback circuit which serves to maintain a predetermined separation of the rollers.

6 Claims, 3 Drawing Sheets

KERNEL CRACKING ASSEMBLY

CROSS REFERENCE TO RELATED PATENT APPLICATIONS

This Patent Application claims priority under 35 U.S.C. § 119 to GB0411825.3, filed on May 27, 2004 titled, "Kernel Cracking Assembly", the full disclosure of which is hereby fully incorporated herein by reference.

FIELD OF THE INVENTION

This invention relates to agricultural vehicles and more specifically to forage harvesters which cut down and process maize or grass to be used for animal feed.

BACKGROUND OF THE INVENTION

Forage harvesters are machines which handle the cutting down of crops in the field and subsequent processing of the relevant crop into a state suitable for animal consumption. This may involve picking up crops, such as grass or alfalfa, which have been pre-cut and allowed to dry off in the sun, or it may require the forage harvester to cut crops, such as maize, directly from the fields.

The crop, whether cut maize or gathered grass, is fed into a rotating knife drum or cutter which chops the product to a suitable length. With grass crops, cutting alone is sufficient to produce the desired forage. When harvesting maize for silage purposes, the cutting alone does not yield enough grain due to the presence of kernels in the crop. The kernels need to be cracked in order to extract the grain as un-cracked kernels are difficult for animals to digest. As cutting alone is insufficient to crack all the kernels, it is supplemented by a further process which passes the cut crop through a kernel cracking assembly, also known as a crop processor. This consists of two close, adjacent rollers, typically having fluted or serrated surfaces, which rotate such that there is slippage between the adjacent surfaces. The gap between the rollers is tailored to the desired diameter of grain passing through and the speed, rotational energy of the rollers, relative movement and fluting of the surfaces ensures that any un-cracked kernels are cracked.

The kernel cracking assembly performs best when the distance between the rollers is small and constant. The performance of the crop processor decreases when the separation of the rollers increases because fewer kernels are cracked. For optimal performance this distance needs to be monitored and adjustable by the operator of the machine.

A crop processor known from U.S. Pat. No. 6,290,599 attempts to solve this problem by controlling the relative positions of the rollers by means of two adjustable stops in the form of plungers which are movably guided in hydraulic cylinders, each arranged at a respective axial end of rollers.

These are problematic in that the rollers are actively moved at both ends by different plungers which, despite being hydraulically coupled, are prone to leak at different rates, causing their displacement to differ slightly from one another. This in turn leads to the rollers being non-parallel and thus less efficient at cracking kernels.

There is therefore a need to carefully control the separation of the rollers and their alignment in order to maintain the efficiency of the kernel cracking assembly.

SUMMARY OF THE INVENTION

With a view to mitigating the foregoing problem, the present invention provides a kernel cracking assembly comprising two frames each supporting a respective one of two rollers between which kernels are crushed; and a hydraulically operated actuator for moving the frames relative to one another to set the separation of the rollers; characterized by a position sensor coupled to the actuator and forming part of a closed-loop feedback circuit which serves to maintain a predetermined separation of the rollers.

The present invention avoids the problem of leakage from hydraulic actuators and other components by virtue of its feedback system. This operates on the error generated from the difference between the desired position and the actual position and moves the actuator accordingly to minimize this. This way the increased leakage of a worn actuator does not affect the accurate placement of the rollers relative to one another.

The actuator may be in the form of a wedge. As the wedge reciprocates, its tapered surface pushes against the frame to move it relative to the direction of reciprocation. This may be similarly achieved when the actuator is in the form of a cam, rotation of which serves to move the frames relative to one another. A further option is the use of a screw, or any device which yields a mechanical distance multiplier advantage.

The separation of the rollers controlled in this way can be more accurately determined if the frames on which they are mounted are pivoted relative to one another.

The actuator functions to separate the frames and hence the rollers by a predetermined amount. This may be achieved by having one suitably shaped actuator (wedge, cam etc.) disposed at one end of the frames. This arrangement can be improved by providing actuators at both ends of the rollers, which may be suitably connected so that the hydraulic action of one actuator is transmitted to the other actuator, so that the separation of the frames and rollers is controlled at both axial ends. The actuators may be hydraulically controlled, either separately or together.

Some known kernel cracking assemblies do not have sufficient structural rigidity to maintain their parallel arrangement relative to one another. It is therefore preferable to use two frames that have sufficient rigidity to maintain the rollers, supported thereby, parallel at all times. With this in mind, the cracking assembly benefits from frames, the structural integrity of which is not dependent upon having the rollers mounted to them.

BRIEF DESCRIPTION OF THE DRAWINGS

The invention will now be described further by way of example with reference to the accompanying drawings in which.

DETAILED DESCRIPTION OF THE PREFERRED EMBODIMENTS

Figure 1:
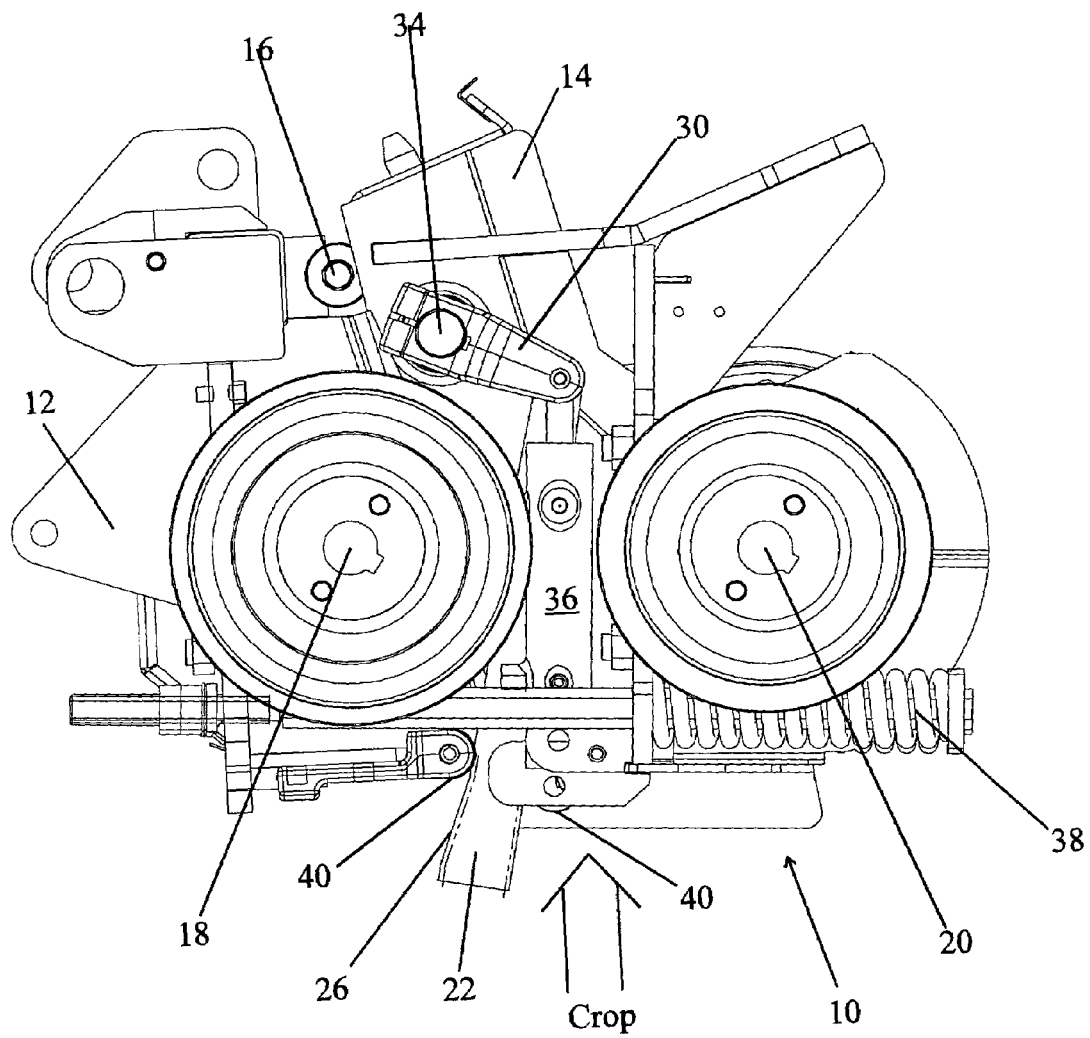
FIG. 1 is a right side line drawing of a crop processor according to the present invention.

FIG. 1 shows an end on view of a kernel cracking assembly (also known as a crop processor) as used in forage harvesters for cracking kernels of maize. The kernel cracking assembly is arranged downstream of the main cutter (not shown) of the forage harvester in the crop flow path, just prior to the blower which urges the crop up a discharge chute and into a suitable vessel normally driven alongside the forage harvest.

In reference to FIG. 1, the assembly 10 consists of two frames 12 and 14 pivotable relative to one another about a pivot pin 16. Each frame supports one of two rollers 18 and 20 along their axial end. An arrow on FIGS. 1 and 2 indicates the path of the crop flow between the two rollers 18 and 20. The rollers 18 and 20 rotate relative to one another at different speeds so that crop passing between them is sheared causing any remaining kernels unaffected by the main cutter to crack open releasing their nutrient.

The separation of the rollers is related to the size of the kernels and maintaining this separation is important to the efficient operation of the kernel cracking assembly.

Figure 2:
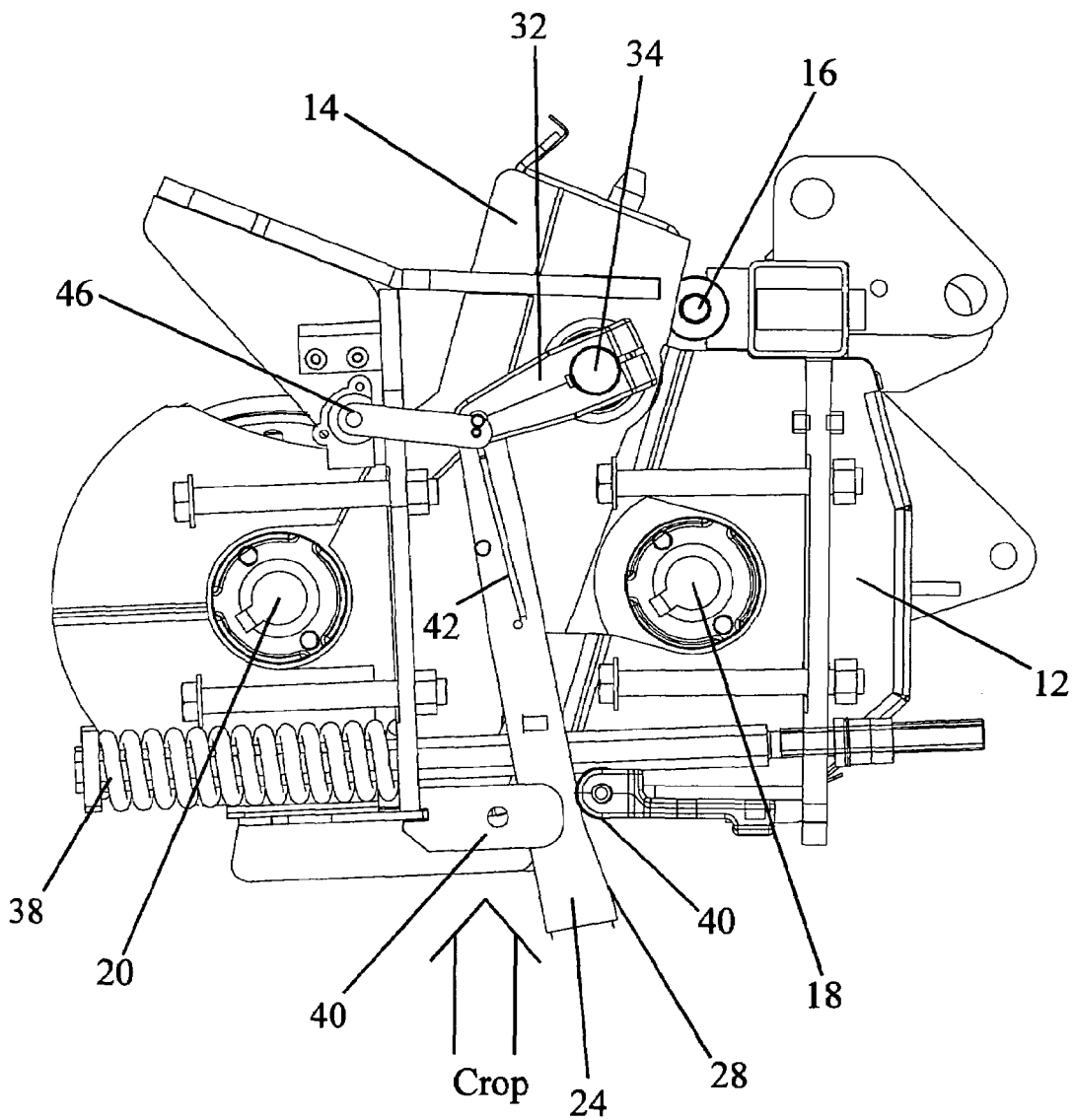
FIG. 2 is a left side line drawing of the crop processor of FIG. 1.

In the embodiment shown in FIGS. 1 and 2, the separation of the frames 12 and 14, and hence the rollers they support 18 and 20, is determined by actuators, in this case wedges 22 and 24. At respective axial ends of the rollers 18 and 20, the wedges 22 and 24 are sandwiched between the frames 12 and 14, the latter being urged towards one another by means of springs 38. The wedges 22 and 24 are pivotally attached by means of cranks 30 and 32 to a transition shaft 34. The crank 30 is further pivotally attached to hydraulic ram 36, which serves to raise or lower both wedges 22 and 24 simultaneously by virtue of their connection through the cranks 30 and 32 and the transition shaft 34.

The wedges 22 and 24, have tapering ramp surfaces 26 and 28, respectively. As the ram 36 forces the wedges to translate relative to a plane containing the axes of the rollers 18 and 20, the ramp surfaces 26 and 28 push against bearings 40 arranged on the frame 12, forcing the frame 12 to separate against the action of the springs 38. Thus, the vertical position of wedges 22 and 24, governs the separation of the roller 18 with regard to roller 20.

In order to determine the position of the wedges or actuators, the wedge 24 is pivotally connected via a tie rod 42 to sensor arm 44. As the wedge 24 translates, tie rod 42 causes sensor arm 44 to rotate relative to the frame 14. This rotation is monitored by a rotational sensor 46 and is indicative of the separation of the rollers.

Figure 3:
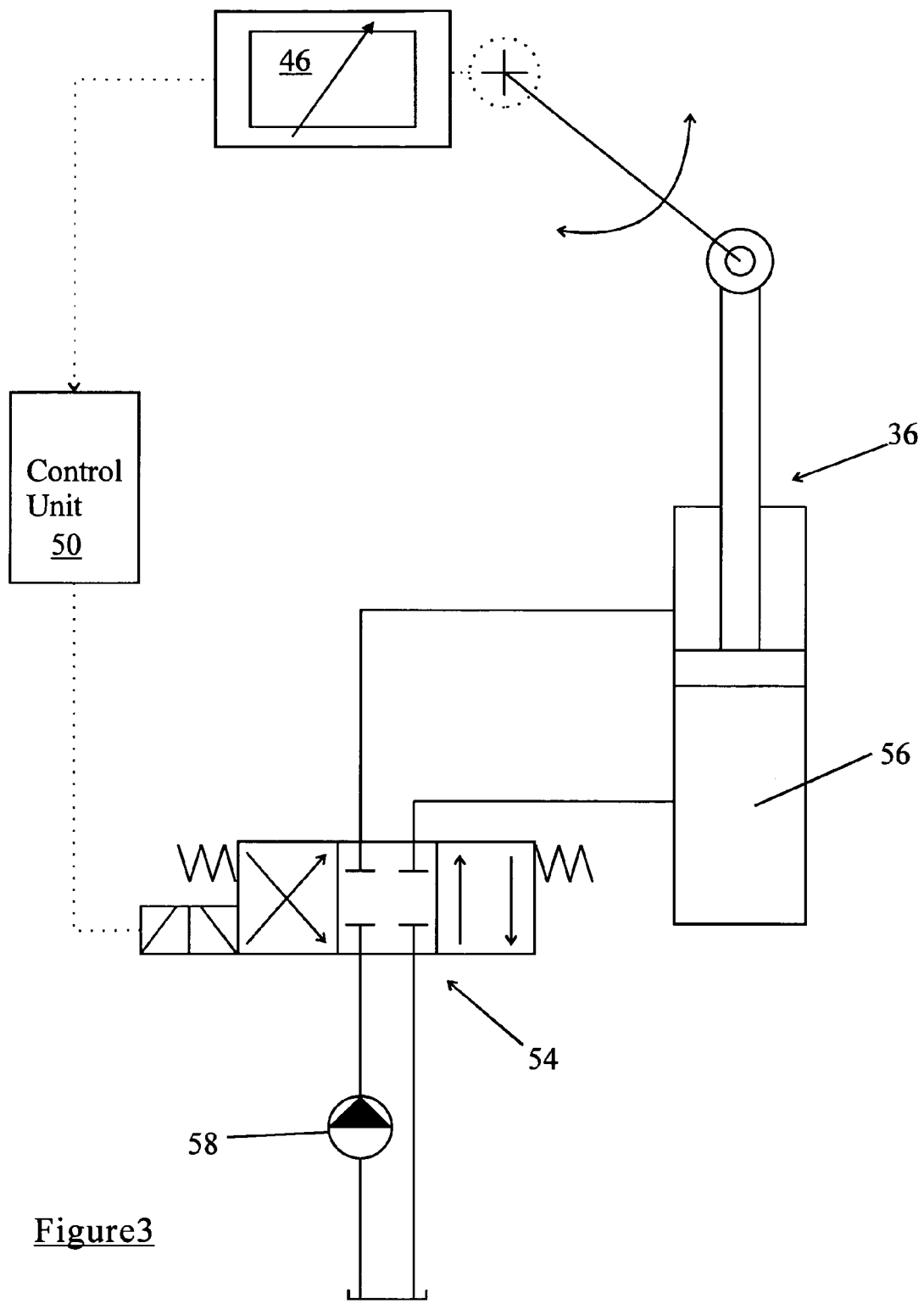
FIG. 3 is a schematic representation of a position feedback sensor.

The position of the hydraulic ram 36, and hence the separation of the rollers 18 and 20, is controlled by the feedback circuit shown in FIG. 3. The hydraulic fluid used to power the ram 36 is provided by hydraulic pump 58, which is connected via control valve 54 to hydraulic cylinder 56. This may be a dedicated pump, or as is more likely to be the case, a pressurized oil supply already employed in the vehicle for other purposes. A control unit 50, having a control panel located for easy access by the vehicle operator, is connected to rotational sensor 46 and control valve 54. The control valve 54 is biased into a central position in which no fluid can flow into or out of cylinder 56 of the hydraulic ram 36. Thus, in the absence of any signal from the control unit 50, the position of the ram 36, and thus the separation of the rollers 18 and 20, remains constant.

The rotational sensor 46 delivers a signal to the control unit indicative of the position of the rollers. At any point the control unit 50 is preset with a desired separation input by the operator of the vehicle. The control unit 50 creates an error signal from the difference between the desired and measured separation of the rollers. The control unit then operates the control valve 54 to minimize this error.

As with any closed loop feedback system, a dead band must be programmed into the control unit 50 in order to prevent the system from oscillating. The dead band dictates the margin of error permitted by the control unit.

The dead band has little effect on the accurate placement of the rollers 18 and 20 due to the mechanical advantage provided by the shape of the actuator 24, be it a screw, wedge or cam. Their use in this application ensures that a significant amount of movement is required by the hydraulic ram 36 in order to produce a relatively small movement in the rollers. The mechanical advantage also means that a relatively small ram 56 will suffice to overcome the force of the springs 38 urging the rollers together.

If the position of the hydraulic ram 36 should change as a result of some leakage of hydraulic fluid past the piston of the ram 56, the resulting movement of the rollers will be detected by the rotational sensor 46 and automatically be compensated for by the feedback circuit.

Though the actuators 22, 24 limit the distance that the rollers can move toward one another, they do not inhibit separation of the rollers. Thus, if a stone should be present in the crop, the two frames will pivot to increase the distance between the rollers to allow the stone to pass without causing permanent damage to the kernel cracking assembly.

What is claimed is:

1. A kernel cracking assembly comprising:
   two frames and two rollers, each one of the two frames supporting a respective one of the two rollers between which kernels are crushed;
   a hydraulically operated actuator for moving the frames relative to one another to set the separation of the rollers;
   a second actuator provided at an axial end of the kernel cracking assembly remote from the hydraulically operated actuator and coupled for movement in synchronism with the hydraulically operated actuator; and
   a position sensor coupled to the hydraulically operated actuator and forming part of a closed-loop feedback circuit which serves to maintain a predetermined separation of the rollers.

2. A kernel cracking assembly as claimed in claim 1, wherein the two frames are mutually pivotable.

3. A kernel cracking assembly as claimed in claim 1, wherein the hydraulically operated actuator is a wedge, cam or lever, the surface of which acts to move at least one of the frames.

4. A kernel cracking assembly as claimed in claim 1, wherein the hydraulic actuator comprises a screw, the thread of which acts to move at least one of the frames.

5. A kernel cracking assembly as claimed in claim 1, wherein the two frames have sufficient rigidity to maintain the rollers, which are supported thereby, parallel at all times.

6. A kernel cracking assembly as claimed in claim 5, wherein the presence of the rollers in the frames does not influence the rigidity of the frames.

* * * * *